United States Patent [19]

Finney et al.

[11] 3,914,441

[45] Oct. 21, 1975

[54] ICE CREAM

[75] Inventors: David John Finney; John Richard Ravenhill; Malcolm John Tait, all of Stevenage, England

[73] Assignee: Lever Brothers Company, New York, N.Y.

[22] Filed: Dec. 7, 1973

[21] Appl. No.: 422,647

[30] Foreign Application Priority Data

Dec. 15, 1972 United Kingdom............... 57943/72

[52] U.S. Cl. ................ 426/565; 426/524; 426/567
[51] Int. Cl.² .......................................... A23G 9/04
[58] Field of Search...................... 426/164, 39, 356

[56] References Cited

UNITED STATES PATENTS

| | | | |
|---|---|---|---|
| 2,555,849 | 6/1951 | Glahe | 426/164 |
| 3,370,955 | 2/1968 | Little | 426/356 |
| 3,378,375 | 4/1968 | Little | 426/356 |
| R27,381 | 5/1972 | Little | 426/356 |

*Primary Examiner*—Jeanette M. Hunter
*Attorney, Agent, or Firm*—Lever Brothers Company

[57] ABSTRACT

Acid ice cream produced using protein that is not acid-precipitable, for example whey protein, or using protein that is acid precipitable but using an acid-stable water-binding stabiliser to reduce coagulation of the protein.

8 Claims, No Drawings

ICE CREAM

BACKGROUND OF THE INVENTION

This invention relates to ice cream and to a process for making it.

Ice cream is a frozen aqueous fat emulsion containing a dispersed gas phase, normally air. The consumer normally will have a clear idea of the difference in taste, appearance and behaviour between ice cream on the one hand and sherbets and sorbets on the other. Nevertheless it is impossible to relate the differences for all cases to differences in one variable. For instance, amount of fat, of protein and of stabiliser play a complex interrelated role. For the purposes of this specification to distinguish between ice cream and sherbets and sorbets reliance is placed first on the generally recognised differences in taste, appearance and behaviour of these products. In cases of serious doubt the following can be used:

| Test* | Ice Cream | Sherbet/Sorbet |
| --- | --- | --- |
| Meltdown | | |
| Type | Cream | Serum |
| Amount | <40ml/hr | >40ml/hr |
| Shape Factor | | |
| At 2 hours | >70 | Liquid |
| At 4 hours | >40 | |
| Mean Diameter of Ice Crystals | <75 microns | >75 microns |

*For an explanation of the tests for Meltdown and Shape Factor see test procedures given hereinbelow Probably the most significant ingredients in giving the characteristics to ice cream that distinguish it from sherbets and sorbets are protein and stabiliser. Their functions are to inhibit ice-crystal growth and to stabilise interfaces between phases in the ice cream. Fat is also important in that it gives the characteristic creaminess. In dairy ice cream, the fat is milk fat, and the protein includes casein and whey proteins. The standard textbook Arbuckle, Ice Cream, 2nd Edition, 1972, AVI Publication Corp, can be referred to for further exposition.

PRIOR ART

The pH of an ice cream mix is generally from 5.4 to 7. A pH substantially lower than 5.4 is not used in ice cream. This is because at such pHs many proteins such as casein precipitate particularly when heat-treatment has been used and it is generally considered that stabilizers at acceptable levels are not capable of preventing the precipitated protein from coagulating. An additional reason is that at such pHs the normally used stabilizers for ice cream such as locust bean gum lose most of their water-binding ability. Coagulated protein contributes little if anything to the structure of the product and leads to products that resemble curd rather than ice cream. Reduced binding of water present in ice cream leads to poor "body". Use of large amounts of the normally used stabilizers would prevent coagulation of the precipitated protein and give adequate product-body but, because of the high level of stabilizer, the product would be too gummy to be acceptable as ice cream.

Casein is precipitated from aqueous solution by addition of acid, precipitation commencing at pH 5.2 and being complete at pH 4.7. Since, as explained, casein precipitation and coagulation destabilises ice cream, the pH of an ice cream mix containing it has to be kept above 5.2, and even at the lowest pH at which such an ice cream can be prepared, namely 5.3 to 5.4, it is liable to show shrinkage because it loses air on storage. The restriction of ice creams to such pHs is a serious disadvantage, because ice cream is often given a fruit flavour, and many fruit flavours require more acid conditions for their full appreciation by the consumer.

THE INVENTION

This prejudice has now been overcome by the realisation that ice cream of pH 3 to 5.2 can be prepared in particular by using a process comprising, in the order given, the steps of (a) emulsifying fat in an aqueous phase containing protein and an acid-stable, water-binding stabiliser in an amount sufficient to prevent the protein coagulating; (b) pasteurising the emulsion formed in step (a); (c) cooling the emulsion to below 15°C; (d) adding an edible acid to the emulsion below 15°C to adjust the pH of the cooled emulsion to from 3.0 to 5.2; and (e) freezing and whipping the emulsion.

The protein will normally be acid-precipitable, for instance casein, and the pH of the emulsion at the end of step (d) should, as well as being in the range 3 to 5.2, preferably 3.0 to 4.5, be sufficiently below the pH at the isoelectric point of the acid-precipitable protein for it to stay uncoagulated. The stabiliser should be edible. At least 80% and preferably at least 95% of the protein should remain uncoagulated. Even when the protein is not acid-precipitable, acid-stable waterbinding stabilisers are preferred; examples of such proteins are bovine serum albumin and the main whey proteins, α-lactalbumin and β-lactoglobulin.

Preferred stabilisers bind at least 50%, preferably at least 70%, of the amount of water at pH 3.5 that they bind at pH 7. Particularly preferred stabilisers are edible polysaccharides or celluloses, preferably with a mean molecular weight greater than 800. Particularly preferred stabilisers are microcrystalline cellulose, dextran, propyleneglycol alginate and corn sugars with DEs (dextrose equivalents) of 15 to 25, preferably 17 to 20. Particularly with these stabilisers carboxymethyl cellulose is present. It is considered it colloidally protects the protein from acid attack. Other compounds that colloidally protect protein can replace the carboxymethyl cellulose. The amount of carboxymethyl cellulose employed, calculated as sodium salt as which is is normally added, is preferably from 0.05 to 0.25% by weight of the aqueous emulsion, as below 0.05% meltdown tends to be too high, and above 0.25% the resulting ice cream tends to be undesirably thick.

As one preferred aspect of the invention it has been discovered that acid dairy ice creams of good stability can be prepared by formulating an ice cream mix at pH 3.0 to 3.85, that is, at least 0.7 pH units lower than that at the isoelectric point of casein, and that under these conditions uncoagulated casein is present and both the casein and whey protein present still exhibit their interfacial function, provided an acid-stable, water binding stabiliser is present. The function of such a stabiliser is to inhibit ice-crystal growth and coagulation of the protein.

An ice cream of this invention is one comprising a frozen aqueous fat emulsion containing uncoagulated protein and a stabiliser, the pH of the emulsion being within the range of from 3.0 to 5.2 and sufficiently below the pH at the isoelectric point of any acidprecipitable protein present in substantial amount for that protein to be present uncoagulated and the stabiliser being, particularly when acid-precipitable protein is present, an acid-stable, water-binding stabiliser.

the fat employed is of course an edible fat, and can be milk fat, as whole milk, cream or butter. Other fatty acid triglycerides that are solid in the emulsified state at about −2°C, for instance palm oil, can be used as a complete or partial replacement of milk fat. The amount of fat present in the ice cream mix will normally be within the range of from 2 to 18% by weight, and particularly good results are obtained with low fat ice creams containing from 2 to 10% by weight of fat, as these low amounts of fat are the most acceptable to the taste under acid conditions.

For taste reasons the uncoagulated protein preferably includes casein. Where casein is present, it can be provided as whole milk, as sodium caseinate or as milk powder, for instance roller- or spray-dried whole milk or skim milk powder. It is most suitable to employ whole milk protein, that is, milk protein in which the casein has not been separated from whey protein, and if desired further whey protein is added. Where whey protein is employed at high levels, it is preferably added as a whey concentrate from which most flavouring materials and a major part of the lactose have been removed, for instance by crystallisation or preferably by reverse osmosis, in order to avoid unwanted whey-flavour and the sandiness which is characteristic of ice creams containing large amounts of lactose. Bovine serum albumin, which is not acid-precipitable, and soya protein, which has an isoelectric point corresponding to about pH 4.6 and like casein, is acidprecipitable, can be used, either by themselves or in a protein combination, for instance with milk protein.

Preferably from 1.5 to 4% by weight of protein is present in the aqueous fat emulsion. This protein can be provided as from 4 to 11% by weight of non-fat milk solids, for instance as skim milk powder.

When casein and soya protein are the only acid-precipitable proteins present, either separately or together, the pH of the ice cream mix can be from 3.0 to 3.85, whereas when wheey protein alone is used, the pH can be from 3.0 to 5.2, as the individual whey proteins, including $\alpha$-lactalbumin and $\beta$-lactoglobulin, are not acid-precipitable.

The acid pH can be provided by any edible acid, for instance hydrochloric, phosphoric, lactic, malic citric, tartaric, fumaric or succinic acids. Combination of hydrochloric acid or of tartaric acid with citric acid is particularly satisfactory for fruit flavour enhancement.

As mentioned a preferred stabiliser is microcrystalline cellulose. An example is the water-dispersible cellulose crystallite aggregates described for use in food compositions in British Patent No. 961,398. A combination of microcrystalline cellulose and sodium carboxymethyl cellulose gives particularly good results, and the microcrystalline cellulose is itself preferably a material in which the particles are themselves coated with 10% of sodium carboxymethyl cellulose by weight of the material. The sodium carboxymethyl cellulose is preferably one of medium viscosity, that is one which in 1% aqueous dispersion has a viscoisty of from 300 to 1000 centipoises at 20°C. Preferably the microcrystalline cellulose is employed in amounts from 0.2 to 1% by weight of the ice cream, as below 0.2% shape retention and meltdown are less satisfactory, while above 1% the resulting ice cream tends to be too thick on the palate.

Another preferred stabiliser that can be used is propylene glycol alginate. U.S. Pat. No. 2,485,935 describes the use of propylene glycol alginate as a stabiliser in ice cream mixes, and shows that this stabiliser is soluble under acid conditions such as could be developed in a dairy ice cream mix by fermentation to give lactic acid contents within the range of 0.43 to 0.55%: the latter concentration corresponds to a pH of 4.5. This pH is close to the isoelectric point of casein where acceptable amounts of propylene glycol alginate are incapable of maintaining the precipitated casein in an uncoagulated state. Products prepared from such fermented mixes would therefore contain coagulated casein and would not be ice creams.

A combination of propylene glycol alginate and dextran, another preferred stabiliser, gives particularly good results. Dextran is a water-soluble alpha-D-glucopyranose polymer of high molecular weight, for instance one prepared from sucrose by fermentation with *Leuconostoc mesentiodes* and having a molecular weight within the range of from $\times 10^6$ to $4 \times 10^7$ Preferably the amount of propylene glycol alginate employed is from 0.2 to 1% by weight of the aqueous emulsion, and preferably from 0.1 to 0.25% by weight of dextran is employed. Smaller amounts of dextran tend to produce ice creams that fragment too readily, while larger amounts give rather thick and hard products. Sodium carboxymethyl cellulose in the above-mentioned amounts can advantageously be added to this stabiliser combination if desired.

The normal ice cream stabilisers, such as the polysaccharide gums, for instance locust bean gum, carrageenan, and guar gum, are ineffective under acid conditions at the concentrations normally used (for example 0.2%), and, although they can be made effective by using greatly increased amounts, these give a generally unacceptable taste to the product. They should in practice therefore only be used in small quantities as adjuncts to the acid-effective stabilisers mentioned above.

The effectiveness of a stabiliser at the chosen pH is reflected by the stand-up (shape retention characteristics), meltdown, and textural homogeneity of the ice cream produced. The stand-up and meltdown can be measured by the following test.

Shape Retention and Meltdown Test

A brick (rectangular prism) of ice cream of length 13.4 cm, height 5.4 cm and width about 8 cm which has been stored at −20°C is placed on a wire gauze (10 wires per inch) in an atmosphere maintained at 15°C. Arrangements are made for collection of the liquid drained from the gauze. After 10 ml of liquid have been collected, the volume of liquid collected in each subsequent 10 minute period is measured and the slope of the graph obtained by plotting volume against time is taken as the meltdown in ml/hr. After 2 hours and again after 4 hours thawing the height $h$ and length $l$ of the residue of the brick are measured, and the degree of shape retention is given by the shape factor calculated as $2.50 \, h/l\%$. The reproducibility of the shape factor measurements with a given ice cream is ±5%.

Preferred ice creams have a shape factor of greater than 80% after 2 hours, a meltdown of less than 25 ml/hr, preferably between 5 and 20 ml/hr, at 15°C, and ice crystals of mean diameter less than 30 microns. Preferred acid-stable water-binding stabilisers when used at 0.4% by weight of the ice cream provide such ice creams.

The aqueous emulsion will in practice usually also contain a sugar or polysaccharide or both for depressing the freezing point of the composition, in amount according to taste and generally from 10 to 20% by weight of the emulsion. Examples are sucrose and corn sugars of DEs (dextrose equivalent) greater than 35.

Small amounts, for instance 0.1 to 0.5% of such standard emulsifiers as long chain fatty acid monoglycerides, for instance palmitic or stearic acid monoglyceride, can also be included in the aqueous emulsion.

An ice cream of the invention which contains a fruit flavour, for instance, orange, blackcurrant, strawberry, raspberry, lemon, greengage, plum, cherry or lime, is particularly valuable.

In preparing the awueous fat emulsion the fat in the liquid state is dispersed in an aqueous phase containing the milk protein and sucrose. Where long chain fatty acid monoglyceride is to be present, it is preferable to dissolve it in the liquid fat. The remaining ingredients except for the acid can be dispersed in the aqueous phase either before or after the fat is added. Preferably the emulsion is formed by homogenisation of the mix at from 40° to 80°C. It is preferable to allow the emulsion to age, for instance by standing, at below 15°C, especially at below 5°C, for at least 1 hour after its formation and pasteurisation. Pasteurisation occurs, for example, by heating at 70°C for 20 mins or at 85°C for 15 secs. The acid is then added, preferably at below 5°C, until the required pH is reached. The emulsion is finally cooled to a temperature at which ice is formed and air or other inert gas is dispersed in it to form the ice cream. Preferably, in a process of the invention an aqueous fat emulsion of pH 5.0 to 8 containing protein and stabiliser is prepared, sufficient acid is dispersed in the emulsion while it is at below 15°C, and preferably below 5°C if no sodium carboxymethyl cellulose has been added, to provide the required pH, and the acid emulsion is then frozen and whipped.

The invention is illustrated by the following Examples, in which temperatures are in °C. Meltdown and shape factor were measured by the test described above. Coolness, representing the capacity of the ice cream to cool the tongue on consumption, was measured by plunging a copper probe at 37° into a sample at −7°, and recording the rate of cooling of the probe in ° over 10 seconds. Hardness was measured as the drag in grams weight on a sectilometer wire drawn through a sample at −15° at constant speed. Shrinkage was measured as the reduction in volume of a sample of the same size as that used in the shape retention test above, stored for 16 weeks at −15°.

EXAMPLES 1 to 3

An ice cream mix was prepared from the following ingredients, in parts by weight.

| | | |
|---|---|---|
| Palm oil | 6.0 | |
| Palmitic monoglyceride | 0.2 | |
| Spray-dried milk powder | 8.5 | |
| containing total protein | | 3.1 |
| casein | | 2.5 |
| Sucrose | 16.0 | |
| Microcrystalline cellulose (containing 10% of sodium carboxymethyl cellulose) | 0.4 | |
| Sodium carboxymethyl cellulose | 0.15 | |
| Locust bean gum | 0.2 | |
| Trisodium citrate | 0.3 | |
| Water | 62.7 | |

The palmitic monoglyceride was dispersed in the palm oil to give a fat phase. The milk powder was dispersed in the water and to the dispersion was added the remaining ingredients, giving an aqueous phase. The fat and aqueous phases at 65° were mixed, homogenised at a pressure of 2000 psi and the emulsion formed was pasteurised at 70° for 20 minutes and cooled at 5° at which it had pH 6.5. After ageing for 2 hours at 5°C 6 parts of a concentrated orange juice, 0.04 parts of a colouring agent, and 3 parts of a 33% by weight aqueous solution of citric acid were mixed with the emulsion. The resulting emulsion of pH 3.5 was converted to an ice cream by cooling and whipping at −4°, and the ice cream was blast frozen to −20° and stored.

Ice creams were prepared from emulsions of pH 3.5 with the same ingredients except that the concentrated orange juice was replaced by 2.5 parts of blackcurrant puree and 1 part of concentrated lemon juice, respectively.

The resulting ice creams were texturally homogeneous and had the following characteristics, in comparison with a typical commercial ice cream.

| Example No. | | 1 Orange | 2 Blackcurrant | 3 Lemon | Typical Commercial Ice Cream |
|---|---|---|---|---|---|
| Overrun % | | 99 | 113 | 97 | 100–120 |
| Coolness ° | | 17.7 | 14.3 | 19.5 | 15–20 |
| Hardness g | | 850 | 1168 | 857 | 1000 |
| Meltdown ml/hr | | 6.75 | 3.0 | 21.25 | 12–15 |
| Shape Factor | 2 hr | 97.0 | 96.0 | 88.7 | 80–85 |
| | 4 hr | 91.0 | 93.6 | 87.5 | 65–70 |
| Shrinkage mm$^3$ | | 70 | 35 | 70 | 0–100 |

EXAMPLE 4

An ice cream was prepared from an emulsion of pH 3.5 as described in Example 1, except that the microcrystalline cellulose was replaced by propylene glycol alginate (0.5 parts) and dextran (0.2 parts).

The resulting ice cream was texturally homogeneous and had the following characteristics:

| | |
|---|---|
| Overrun % | 110.5 |
| Coolness ° | 15.3 |
| Hardness g | 1332 |

| | -Continued | |
|---|---|---|
| Meltdown ml/hr | | 0 |
| Shape Factor | 2 hr | 95.0 |
| | 4 hr | 80.0 |
| Shrinkage mm³ | | 35 |

EXAMPLE 5

An excellent ice cream can be prepared basically as described in Example 1 by using spray-dried whey purified by reverse osmosis instead of spray-dried milk powder.

EXAMPLE 6

The stability of whey proteins at intermediate pHs can be exploited by repeating Example 5 using cherry juice instead of orange juice and adjusting the pH to 4.5.

EXAMPLE 7

When bovine serum albumin is used instead of whey protein in Example 6 a comparable ice cream is obtained.

EXAMPLE 8

When soya protein is used instead of casein in Example 1 a comparable ice cream is obtained.

What is claimed is:

1. A process for preparing an ice cream consisting essentially of the steps of:
    a. emulsifying fat in an ice cream aqueous phase containing, by weight, 1.5 to 4 percent casein or soya protein and an acid-stable, water-binding stabilizer selected from the class consisting of microcrystalline cellulose, dextran, propyleneglycol alginate and corn sugars with Dextrose Equivalents of 15 to 25 in an amount sufficient to prevent the casein or soya protein coagulating;
    b. pasteurizing the emulsion formed in step (a);
    c. cooling the emulsion to below 15°C;
    d. adding an edible acid to the emulsion below 15°C to adjust the pH of the cooled emulsion to from 3.0 to 3.85 and,
    e. freezing and whipping the emulsion.

2. A process as claimed in claim 1 in which in step (d) the emulsion is below 5°C.

3. A process for preparing an ice cream consisting essentially of the steps of
    a. emulsifying fat in an ice cream aqueous phase containing, by weight, 1.5 to 4 percent casein or soya protein and an acid-stable, water-binding stabilizer selected from the class consisting of microcrystalline cellulose, dextran, propyleneglycol alginate and corn sugars with Dextrose Equivalents of 15 to 25 in an amount sufficient to prevent the casein or soya protein coagulating;
    b. pasteurizing the emulsion formed in step (a);
    c. cooling the emulsion to below 15°C;
    d. adding an edible acid to the emulsion below 15°C to adjust the pH of the cooled emulsion to from 3.0 to 3.85; and,
    e. freezing and whipping the emulsion in which process at any stage before step (d), from 0.05 percent to 0.25 percent, by weight of the emulsion of sodium carboxymethylcellulose is added to the aqueous phase.

4. A process for preparing an ice cream consisting essentially of the steps of
    a. emulsifying fat in an ice cream aqueous phase containing, by weight, 1.5 to 4 percent casein or soya protein and an acid-stable, water-binding stabilizer selected from the class consisting of microcrystalline cellulose, dextran, propyleneglycol alginate and corn sugars with Dextrose Equivalents of 15 to 25 in an amount sufficient to prevent the casein or soya protein coagulating;
    b. pasteurizing the emulsion formed in step (a);
    c. cooling the emulsion to below 15°C and then aging said emulsion for at least one hour at a temperature below 15°C;
    d. adding an edible acid to the emulsion below 15°C to adjust the pH of the cooled emulsion to from 3.0 to 3.85; and,
    e. freezing and whipping the emulsion.

5. A process for preparing an ice cream consisting essentially of the steps of
    a. pasteurizing an ice cream aqueous phase containing, by weight, 1.5 to 4 percent casein or soya protein and an acid-stable, water-binding stablizer selected from the class consisting of microcrystalline cellulose, dextran, propyleneglycol and corn sugars with Dextrose Equivalents of 15 to 25 in an amount sufficient to prevent the casein or soya protein coaqulating;
    b. emulsifying fat in the ice cream aqueous phase;
    c. cooling the emulsion formed in step (b) to below 15°C;
    d. adding an edible acid to the emulsion below 15°C to adjust the pH of the cooled emulsion to from 3.0 to 3.85; and,
    e. freezing and whipping the emulsion.

6. An ice cream consisting essentially of a frozen aqueous fat emulsion containing, by weight, 1.5 to 4 percent casein or soya protein and an acid-stable, water-binding stabilizer selected from the class consisting of microcrystalline cellulose, dextran, propyleneglycol alginate and corn sugars with Dextrose Equivalents of 15 to 25 in an amount sufficient to prevent the casein or soya protein coagulating, the emulsion having a pH of 3.0 to 3.85.

7. An ice cream consisting essentially of a frozen aqueous fat emulsion containing, by weight, 1.5 to 4 percent whey protein purified by reverse osmosis as sole protein the emulsion having a pH of 3.0 to 5.2.

8. A dairy ice cream consisting essentially of a frozen aqueous fat emulsion containing, by weight, 1.5 to 4 percent of protein consisting of casein and whey protein and an acid-stable, water-binding stabilizer selected from the class consisting of microcrystalline cellulose, dextran, propyleneglycol alginate and corn sugars with Dextrose Equivalents of 15 to 25 in an amount sufficient to prevent the casein coagulating, the emulsion having a pH of 3.0 to 3.85.

* * * * *